(12) United States Patent
Cutler et al.

(10) Patent No.: US 6,200,483 B1
(45) Date of Patent: Mar. 13, 2001

(54) STRUCTURED MATERIALS FOR PURIFICATION OF LIQUID STREAMS AND METHOD OF MAKING AND USING SAME

(75) Inventors: Willard A. Cutler; Tinghong Tao, both of Big Flats; Jennifer M. Torns, Painted Post, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/413,717

(22) Filed: Oct. 5, 1999

Related U.S. Application Data
(60) Provisional application No. 60/103,399, filed on Oct. 7, 1998.

(51) Int. Cl.[7] ..................................................... C02F 1/42
(52) U.S. Cl. ............................ 210/685; 210/688; 502/71; 502/527.19
(58) Field of Search ................................. 502/527.19, 71, 502/60; 210/681, 682, 683, 684, 685, 686, 688, 687

(56) References Cited

U.S. PATENT DOCUMENTS

| | | |
|---|---|---|
| 3,885,977 | 5/1975 | Lachman et al. . |
| 4,127,691 | 11/1978 | Frost . |
| 4,758,272 | 7/1988 | Pierotti et al. . |
| 4,992,233 | 2/1991 | Swaroop et al. . |
| 4,994,191 * | 2/1991 | Kuznicki et al. .................... 210/688 |
| 5,427,601 | 6/1995 | Harada et al. . |
| 5,451,444 | 9/1995 | DeLiso et al. . |
| 5,569,634 * | 10/1996 | Miller et al. ............................ 502/64 |
| 5,716,899 * | 2/1998 | Guile et al. . |
| 5,750,026 * | 5/1998 | Gadkaree .......................... 210/502.1 |
| 6,004,469 * | 12/1999 | Sander et al. ........................ 210/763 |
| 6,074,974 * | 6/2000 | Lee at al. . |
| 6,129,846 * | 10/2000 | Gadkaree . |

* cited by examiner

Primary Examiner—Chester T. Barry
(74) Attorney, Agent, or Firm—L. Rita Herzfeld; Anca C. Gheorghiu

(57) ABSTRACT

A monolithic structure having active material that includes at least inorganic ion exchange material, for purifying a liquid stream of contaminants such as heavy metals, chlorine, volatile organics, pesticides, herbicides, and/or parasites, etc. The structure has an inlet end and an outlet end and a multiplicity of cells extending from inlet to outlet end. The cells are separated from one another by porous walls that are alternatively plugged at each end such that a liquid stream that enters the structure, enters through the unplugged cells at the inlet end and passes through porous walls to be purified by the active material, and thereafter passes out of the structure through unplugged cells at the outlet end. One method of making the structure involves applying active material as a coating on an alternately plugged substrate. The average particle size of the active material after calcination is greater than the average cell wall pore size of the substrate. The coated substrate is dried at no greater than 200° C., and calcined at no greater than 650° C., to bond the active material to the substrate. The structure can be shaped from a forming mixture of the active materials.

27 Claims, No Drawings

STRUCTURED MATERIALS FOR PURIFICATION OF LIQUID STREAMS AND METHOD OF MAKING AND USING SAME

This application claims the benefit of U.S. Provisional Application No. 60/103,399, filed Oct. 7, 1998, entitled "Structured Materials for Purification of Liquid Stream and Method of Making and Using Same", by W. Cutler et al.

This invention relates to monolithic structures for removing contaminants from liquid streams using inorganic purifying agents.

BACKGROUND OF THE INVENTION

Various ion exchange materials, both organic and inorganic, are widely acknowledged as having the ability to remove certain metal ions such as lead from aqueous solutions. The use of organic ion exchange materials is popular in current carafe or gravity filter products. One of the disadvantages of organic ion exchange materials is that they swell when in contact with water while inorganic materials do not swell. The organic ion exchange materials are not stable at high temperatures. Most of the organic ion exchange materials are expensive and used in a packed bed form.

The use of inorganic materials such as crystalline zeolites and amorphous gels is much less popular. In the water treatment industry inorganics find use in lead removal, but appear to be in particulate or granular form. For example, it is well known that inorganic ion-exchange materials can provide the same function as organic ion exchange resins. Commercially available carbon block filters, made from granular activated carbon (GAC), commonly mix amorphous titanium-silicate powders with their GAC and polymer binders before forming. The amorphous titanium-silicate powders are used for lead and other heavy metal removal in drinking water. These powders are held in place by the polymer binders and the GAC.

There are some claims of inorganic ion exchange materials being attached to other support materials, such as carbon granules. However, the support in such cases is still a particle or granule itself. Unfortunately, the bonding between the ion exchange material and the granular carbon support has typically been quite poor, resulting in continual sloughing off of the ion exchange material. As a result, large amounts of water are needed to wash the filter before the water is clear enough for consumption.

There is never a guarantee that the water is completely free of ion exchange material. The continual sloughing off shortens the life of the device and may have adverse effects on the health of individuals drinking such treated water.

A common method for ion exchange purification is to run the feed solution through a column filled with the ion exchange material. In order to accomplish significant ion exchange, columns of considerable length are sometimes required. However, with increasing column length, the flow rate decreases. Also, such columns develop channeling of the feed solution, which decreases the ion exchange efficiency.

Accordingly, a need exists for efficient liquid purification devices in which the disadvantages of loose powder or granular or loosely bound materials are eliminated and in which the disadvantages of decreased flow due to channeling are eliminated.

The present invention provides such structured materials and methods.

SUMMARY OF THE INVENTION

In accordance with one aspect of the invention, there is provided a monolithic structure having active material that includes at least inorganic ion exchange material, for purifying a liquid stream of contaminants such as heavy metals, chlorine, volatile organics, pesticides, herbicides, and/or parasites, etc. The structure has an inlet end and an outlet end and a multiplicity of cells extending from inlet to outlet end. The cells are separated from one another by porous walls that are alternatively plugged at each end such that a liquid stream that enters the structure, enters through the unplugged cells at the inlet end and passes through porous walls to be purified by the active material, and thereafter passes out of the structure through unplugged cells at the outlet end.

In accordance with another aspect of the invention, there is provided a method of making the above-described structure that involves applying active material as a coating on an alternately plugged substrate. The average particle size of the active material after calcination is greater than the average cell wall pore size of the substrate. The coated substrate is dried at no greater than 200° C., and calcined at no greater than 650° C., to bond the active material to the substrate.

In accordance with another aspect of the invention, the structure can be shaped from a forming mixture of the active materials.

DETAILED DESCRIPTION OF THE INVENTION

This invention relates to monolithic structures for purifying liquid streams. The structures have inorganic active purifying material that includes ion exchange material.

The structured materials are in the form of a cellular monolith having an inlet end and an outlet end, the cells running the length of the monolith from inlet end to outlet end. The cells have porous walls through which a liquid stream can pass. The cells are alternately plugged at the inlet and outlet ends, allowing liquid to flow through the cell walls.

The structured materials of this invention are suitable for purification of water containing ionexchangeable materials. These exchangeable species include but are not limited to: lead, copper, chromium, nickel, cadmium, arsenic, mercury, silver, zinc, Ca, Mg, and other hard water minerals. According to this invention chlorine, volatile organic chemical (VOCs), herbicides and/or pesticides can be removed when a carbon-based monolith is used. Structured materials are also suited for particulate and cyst removal (by physical filtration). In the latter applications, the appropriate porosity is created to filter off these contaminants.

The honeycomb geometry, (characterized by a large number of cells per unit area) is especially advantageous for efficiently removing pollutants. Preferably, the cells are symmetric.

Generally honeycomb cell densities range from 235 cells/$cm^2$ (about 1500 cells/$in^2$) to 1.5 cells/$cm^2$ (about 10 cells/$in^2$). Some examples of commonly used honeycombs, although it is to be understood that the invention is not limited to such, are about 94 cells/$cm^2$ (about 600 cells/$in^2$), about 62 cells/$cm^2$ (about 400 cells/$in^2$), or about 47 cells/$cm^2$ (about 300 cells/$in^2$), and those having about 31 cells/$cm^2$ (about 200 cells/$in^2$) and 15 cells/$cm^2$ (about 100 cells/$in^2$). Typical wall thicknesses are for example, about 0.15 mm (about 6 mils) for about 31 cells/$cm^2$ (about 200 cells/$in^2$) honeycombs. Wall (web) thickness range typically from about 0.1 to about 1.5 mm (about 4 to about 60 mils). Honeycombs having about 15 to about 62 cells/$cm^2$ (about 100 to about 400 cells/$in^2$) and about 0.30 to about 0.75 mm (about 12 to about 30 mil) wall thicknesses are especially suited for filter applications. This invention is especially advantageous for honeycombs having appropriate wall pore size in the range of 0.1 to 100 micrometers, with preferred range of 1–20 micrometer, and a wall porosity of 15–75%.

The cells of the multicellular device are selectively plugged to allow maximum contact of their walls with the liquid stream for maximum purification efficiency. Plugging can be done by techniques known in the art using compatible plugging materials that will seal off the cell.

For example, with ceramic materials two part epoxy is suitable.

A wide range of inorganic purifying agents can be used and are selected depending on the pollutants to be removed. For cation exchange, the purifying agent must have an acidic surface (proton on the surface). For anion exchange, the purifying agent must have a basic surface. Some examples of purifying agents, although it is to be understood that the invention is not limited to these, are one or more of the following: zeolites, gamma alumina, clays, zirconia, sulfonated zirconia, heteropoly acids, e.g. heteropoly molybdic acid, amorphous titanium silicates, etc.

Some agents that are especially suited for lead removal are Y-zeolite, gamma alumina, and/or titanium silicate.

This invention can be practiced in several ways. One way is to contact a multicellular substrate with active material either by washcoating a slurry of discrete particles of the active material onto the substrate, or by creating a thin film by synthesizing the active material from precursors, on monolithic articles by hydrothermal synthesis or precipitation and growth techniques. Another way is to directly form the active material into monolithic articles, e.g. by extrusion, pressing, molding, or other forming processes.

Uniformly coating a thin layer of active material results in increased contact efficiency between the active material and the polluted stream, thereby increasing purification efficiency without any compromise in liquid flow rate. One of the advantages of this invention is that a relatively small amount of active material is used per unit volume to remove pollutants to very low levels during life cycle. Therefore, the cost of material and its associate processing costs are competitive with the current practice of using organic and inorganic ion exchange materials.

Some materials that are especially suited to the practice of the present invention as substrates for coating applications, although it is to be understood that the invention is not limited to such, are those made of ceramic, glass, glass-ceramic, metal, molecular sieve and carbon.

By ceramic, glass ceramic and glass ceramic powders is meant those materials as well as their pre-fired precursors. By combinations is meant physical or chemical combinations, eg., mixtures or composites. Examples of these powder materials are cordierite, mullite, clay, talc, zircon, zirconia, spinel, aluminas and their precursors, silicas and their precursors, silicates, aluminates, lithium aluminosilicates, alumina silica, feldspar, titania, fused silica, nitrides, carbides, borides, eg., silicon carbide, silicon nitride, soda lime, aluminosilicate, borosilicate, soda barium borosilicate or mixtures of these, as well as others. Some typical ceramic substrates are disclosed in U.S. Pat. Nos. 4,127,691 and 3,885,977. Those patents are herein incorporated by reference as filed.

Suitable metallic materials are any metal or alloy or intermetallic compound that provides durable structural service. Particularly useful are alloys which are predominantly of iron group metal (i.e. Fe, Ni, and Co), either with carbon (e.g. steels, especially stainless or high temperature steels) or without carbon. Most typical of the latter alloys for higher temperature service are those of iron group metal and aluminum, with the preferred iron group metal being iron. Especially preferred is Fe, Al, and Cr. For example, Fe5-20Al5-40Cr, and Fe7-10Al10-20Cr powders with other possible additions are especially suited. Some typical compositions of metal powders for forming substrates are disclosed in U.S. Pat. Nos. 4,992,233, 4,758,272, and 5,427,601 which are herein incorporated by reference as filed.

Some types of molecular sieves which are preferred for the practice of the present invention are carbon molecular sieves, zeolites, metallophosphates, silicoaluminophosphates, and combinations of these. Carbon molecular sieves have well defined micropores made out of carbon material.

Molecular sieves that are especially suited to the invention are the zeolites. Some suitable zeolites are pentasil, such as ZSM-5, Y, such as ultrastable Y, beta, mordenite, X, such as 13X, or mixtures thereof.

Carbon substrates, made by methods known in the art of shaping carbon powders or carbon precursors to eventually be carbonized and activated to form activated carbon, can also be used.

Also useful as substrates are any of the aforementioned inorganic substrates coated with activated carbon, preferably derived from carbon precursors, such as thermosetting resins. Such carbon coated substrates are disclosed in U.S. Pat. No. 5,451,444, which is herein incorporated by reference.

Washcoating techniques involve forming a washcoating slurry of the active material particles with various binders, e.g. aluminum nitrate, and/or colloidal alumina (which is meant to include those materials which when fired form alumina), and then contacting the slurry with a substrate. The washcoating slurry has a viscosity of preferably about 10 to 10,000, and more preferably about 20 to 200 cp. The average particle size of the active powder in the slurry is preferably about 1 to 100, and more preferably about 2 to 10 micrometers in diameter. The weight ratio of active material:binder:water in the slurry is preferably about 1:1:2 to 1:20:20, and more preferably about 1:2:2 to 1:10:10. The contacting can be done any number of times to achieve the desired loading, but preferably there is only a single contact of substrate with washcoating slurry.

The resulting washcoated composite body can then be heat-treated to improve bonding between the substrate and the active material. This is done by drying and calcining. The drying is done preferably under rotating conditions. The drying temperature is preferably about 40–200° C., and more preferably at about 80–150° C. for at least about 0.5 hr. The calcination is done preferably at a temperature of about 250–650° C., and more preferably at about 300–500° C. for at least about 0.5 hour. Most preferred calcination conditions for washcoated bodies are at about 350–450° C. for at least about 2 hr. More typically the amount of washcoat on the substrate is about 1–20 wt. % and most typically about 2–10 wt. % based on the total weight of substrate and coating.

One of the features of the present invention is that the interaction between the substrate and the active material is substantial enough so that the active material remains permanently on or within the substrate.

Although there is abundant knowledge in the literature about washcoating materials onto monolithic body for automotive catalytic converter applications, these technologies are not applicable in water purification cases.

Conventional automotive catalyst washcoating processes do not provide acceptable coatings for these applications.

Automotive applications require typically >20%, usually up to 45% pickup. This high pickup significantly limits the flow rate and results in an uneven washcoat thickness. Due to difference in the kinetics between gas phase and liquid phase reactions, the washcoat uniformity in gas phase auto-exhaust treatment is not nearly as important as in liquid stream purification. Liquid stream purification requires a very thin, uniform washcoat so that an even liquid flow passes through each part of the wall.

Some monoliths are inherently more difficult to coat than others. For example, monoliths made of carbon-based material, which is relatively inert, are sought after for many applications, but provide a unique challenge because adhesion of most materials to the carbon surface is not very good. Therefore, the key challenge is to improve adhesion between carbon surface and inorganic active materials. At the same time, the washcoated materials must be retained in the substrate. Because a carbon surface is predominately hydrophobic, there are wetting problems when a carbon substrate is contacted with an aqueous solution. This additional washcoated layer of inorganic ion-exchange materials produces a hydrophilic surface and solves the wetting problem associated with carbon surface. The washcoating technique works especially well with inorganic ion exchange material for heavy metal removal. In this case, no organic precursors, particularly hydrocarbon precursors, can be used as binders or additives due to coke formation in the subsequent calcination or heat treatment, as the formed coke would primarily occupy/block all acidic ion exchange functionalities on the surface, thus causing the coated materials to lose all capability for heavy metal removal.

In some cases it may be desirable to have the monolith provide more than just the ion exchange function. For example a carbon, or more particularly an activated carbon substrate can have the function of chlorine removal, volatile organic compounds (VOC) removal, pesticide and/or insecticide removal, while a layer of ion exchange material can be for heavy metal removal. Particulate matter removal, and cysts removal can also be achieved via physical filtration through porous honeycomb walls by utilizing a honeycomb with appropriate wall porosity characteristics.

In all aspects of this invention, maintaining an acceptable liquid flow rate under wall flow conditions (gravity or pressurized flow) is important. More restricted coating requirements are needed, therefore, in water purification (as opposed to automotive applications) such as: 1) Uniform coating layer; 2) Retention of all original acidic functions in coated materials; 3) A thin as possible coating layer to maximize flow at no compromised removal efficiency (>90%); 4) Good adhesion between the substrate surface (ceramic, carbon, etc.) and coated materials; 5) No detrimental effect on other cofunctions, if applicable: chlorine, volatile organic compounds (VOC), particulate matter, and cysts removals.

Significantly different from requirements in automotive applications, a more effective uniform and ultra-thin layer of inorganic ion exchange material strongly bonded to the surface of the monolith is needed to maintain both liquid stream flow rate and heavy metal removal efficiency and capacity. According to NSF testing standard 53, the lead removal efficiency has to be greater than 90% for 1.2–2x the filter life. Contact times of less than 30 seconds are generally commercially acceptable. The contact time is often shorter (~2 seconds) in water purification filter other than gravity Carafe filter applications. Moreover, the effectiveness of washcoated inorganic ion exchange material for heavy metal removal should be met in typical drinking water conditions, in which there are some co-existing cations (Mg, Ca and other hardness ions) in water. To meet these requirements, a washcoating slurry must be very carefully formulated in terms of its material ion exchange capability including both removal efficiency and capacity, its composition, and viscosity.

As an example of the inventive washcoating, gamma alumina, zeolites, or amorphous titanium silicates washcoated onto carbon-impregnated cordierite honeycomb e.g. as described in U.S. Pat. No. 5,451,444, using aluminum nitrate, or colloidal silica, or silica gel as bonding agents under appropriate solution conditions are found to be very effective for lead removal. In the process, there is only about 3–5 wt. % of inorganic ion exchange materials picked up onto the honeycomb. Because of the low pickup and a resultant thin layer, the washcoated honeycomb is able to have sufficient water flow rate under flow through wall conditions. It is demonstrated that such low percentage of washcoating pickup has surprisingly high capacity for heavy metal removal function.

A coated inorganic ion exchange material on a monolithic substrate according to this invention has the following characteristics: 1) the materials are uniformly coated on monolithic honeycomb structures; 2) the coated materials are able to remove lead or other heavy metals in liquid stream at high efficiency (>90%) during life cycle testing; 3) the material pickup during coating is in the range of 1–15 wt %, which provides a thin layer of coating to obtain commercially acceptable liquid flow rate levels; 4) because of the composition and process, adhesion between carbon surfaces and coated materials is strong enough to retain all coated materials; 5) there is no negative effect found on other co-functions, if applicable: chlorine, volatile organic compounds (VOC), particulate matter, and cysts removals.

In accordance with another embodiment, the active material, e.g. inorganic ion exchange material for heavy metal removal in drinking water such as zeolites and titanium silicates, can be grown through conventional hydrothermal synthesis onto monolithic substrates at the appropriate temperatures and pressures. Due to surface chemistry, surfaces inside honeycomb cells acts as crystal nuclei sites for crystal and structural growth. By controlling reaction conditions in synthesis, the thickness and uniformity of the coating of active material can be moderated to the desired level.

In another embodiment, the substrate can be treated with a solution of active material precursors which are precipitated onto the cell wall surfaces. This is done by adjusting solution parameters such as pH using appropriate acids or bases. The formed precipitates will physically deposit and grow on the substrate wall surfaces. To ensure the uniformity of deposition and coating, rigorous agitation or circulation of solution is needed. The precipitates are heat-treated to convert into suitable active materials, e.g. ion exchange materials. At same time, the interaction between honeycomb surface and active material is enhanced. Upon necessity, the heat-treated samples may need to be acidified to recover the active material functions, such as ion exchange functions, that were lost in the precipitation process.

The inorganic ion exchange materials can also be directly shaped via extrusion, molding, and pressing, etc. into a structurally shaped body. This is typically done using appropriate mixtures of structural ceramic materials, inorganic ion exchange materials, pore-forming materials, and chemical bonding agents, other additives. Some ceramic material compositions for honeycomb extrusion and inorganic ion exchange materials are disclosed in U.S. Pat. Nos. 4,127,691 and 3,885,977. Those patents are herein incorporated by reference as filed.

As an example of inventive inorganic ion exchange material shape forming process, gamma alumina with appropriate chemical and physical properties (such as acidity and acid density, pore size and volume, surface area, etc.) is selected to mix with water in extrusion processing; or with thermosetting resins such as phenolic resin in molding processing, or with binding agents of pseudo boehmite or other gamma alumina precursors or methylcelluloses and fugitive pore forming additives. Following the forming process, the shaped parts are treated in air upon heating to remove unwanted additives and also to sinter into desired physical strength. In the case of gamma alumina, acidic functionality on its surface can be recovered by treating in acidic solutions such as $HNO_3$, $H_2SO_4$ or HCl aqueous solution.

To more fully illustrate the invention, the following non-limiting examples are presented. All parts, portions, and percentages are on a weight basis unless otherwise stated. (Coating weight is based on the total weight of the substrate and coating.)

EXAMPLE 1

Due to expected pressure drop on wall-flow filter configuration, achievable maximum water flow rate under standard operation conditions of either point of use or point of entry applications is one of the most important parameters. Washcoating quality including coating uniformity and thickness on cell walls significantly affects water flow rate. To demonstrate the inventive washcoating quality, maximum water flow rate testing was conducted at gravity flow condition. A maximum flow rate was found to be 198 ml/min/in$^3$ for an alternately plugged carbon impregnated cordierite honeycomb (CIH), and 83% of 198 ml/min/in$^3$ or 164 ml/min/in$^3$ for the invented washcoated carbon impregnated cordierite honeycomb. In contrast, a maximum water flow rate was only 32% of 198 ml/min/in$^3$ or 64 ml/min/in$^3$ for the washcoated CIH honeycomb using a standard automotive washcoating process described in following Examples 2a–2d.

Examples 2a–2d describe the inorganic ion exchange material washcoated honeycomb made by a standard automotive catalyst washcoating process and their performance in purification of lead-contaminated liquid stream.

EXAMPLE 2a

A commercial powder acidic gamma alumina was mixed with the appropriate amount of water and colloidal alumina to form a slurry. The pH of the slurry was adjusted to 3.5–4 using $HNO_3$ if necessary. The slurry was milled using a rolling mill at 5 to 1 ratio of powder to alumina ball media until 50% of the alumina particles reached smaller than 5 $\mu$m. The slurry pH value was checked and readjusted to 3.5–4 if necessary. A 2.54 cm. (1") diameter by 3.81 cm. (1.5") height cordierite honeycomb sample having 62 cells/cm$^2$ (400 cells/in$^2$) with a 0.3 mm wall thickness was dipped into the slurry. After excess slurry is removed from the honeycomb channels using blowing air, the coated honeycomb was dried in a drying oven for at least 2 hours at 120° C. The dipping process was repeated to allow a pick-up of about 42%. The final washcoated honeycomb was fired in air at 5° C./min. up to about 600° C. and then held at about 600° C. for about 3 hrs. The cells of the washcoated cordierite honeycomb were alternatively plugged using a two-part epoxy resin. The honeycomb was then mounted and inserted into a gravity Carafe filter testing system for evaluation of lead removal capability including lead removal efficiency and capacity. According to NSF 53, the sample evaluation experiment was conducted by flowing lead-spiked water at a concentration of about 150 ppb at pH=6.5 and 8.5, respectively. The lead concentration in the effluent and influent were periodically analyzed using plasma atomic emission spectroscopy (ICP/MS). At a flow rate of 100 ml/min (maximum flow rate), the lead removal efficiency for the washcoated cordierite honeycomb was 10–15% from the 25 liters of water that was passed through.

EXAMPLE 2b

Using the same sample preparation technique and lead removal testing procedure stated in Example 2a, cordierite honeycombs were washcoated with particulate gamma alumina to achieve a 38 wt. % pickup. At a maximum flow rate of 100 ml/min, the lead removal efficiency for the washcoated cordierite honeycomb was 10–18% from the 50 liters of water that was passed through.

EXAMPLE 2c

Using the same sample preparation technique and lead removal testing procedure stated in Example 2a, cordierite honeycombs were washcoated with Y-zeolite to achieve a 26 wt. % pickup. At a flow rate of 100 ml/min, the lead removal efficiency for the washcoated cordierite honeycomb was 12–15% in the 50 liters of water that passed through.

EXAMPLE 2d

Using the same sample preparation technique and lead removal testing procedure stated in Example 2a, cordierite honeycombs were washcoated with amorphous titanium silicate, for heavy metal removal in drinking water, to achieve a ~40 wt. % pickup. At a maximum flow rate of 100 ml/min, the lead removal efficiency for the washcoated cordierite honeycomb was 40% in the beginning and decreased to 12% after 50 liters of water passed through.

EXAMPLE 3

A commercial powdered acidic $\gamma$-alumina (about 21.76 micrometer particle size) with surface area of 340 m$^2$/g and pore volume of 0.8 ml/g was provided. After grinding into 50% of particles smaller than 2.668 micrometers, 2.50 g of the $\gamma$-alumina was mixed with 1.26 g aluminum nitrate in 20 ml deionized water. The slurry was mechanically stirred overnight to achieve a homogenous mixture and then washcoated onto a 2.54 cm. (1") diameter×5.08 cm. (2") high carbon impregnated honeycomb (CIH) having 82 cells/cm$^2$ (400 cells/in$^2$) with a 0.3 mm wall thickness. The coated honeycomb was dried in a stationary position at 120° C. in a drying oven and fired to 400° C. in an inert gas of argon for 2 hours. As a result, the honeycomb picked up about 3.0 wt. % of washcoated materials. The coated carbon honeycomb was alternatively plugged using a two-part epoxy resin and inserted into a gravity Carafe filter testing system for evaluation of lead removal capability including removal efficiency and capacity. According to NSF 53, the sample evaluation experiment was conducted by flowing lead spiked water at a concentration of about 150 ppb at pH=6.5 and 8.5, respectively. The lead concentration in the effluent and influent were periodically measured using plasma ICP/MS. At a flow rate of 150 ml/min, the lead removal efficiency for the washcoated CIH honeycomb was 47% in the beginning and decreased to 35% after 50 liters of water passed through. The efficiency then remained steady around 35% up to 120 liters of water used.

EXAMPLE 4

A commercial powdered ZSM-5 zeolite (about 16.89 micrometers) with surface area of 600 m$^2$/g and pore volume of 0.45 ml/g was provided. Using the same sample preparation technique and lead removal testing procedure stated in Example 3, the zeolite was first ground to a particle size of 50%=2.253 micrometers. About 5 g of the zeolite was mixed with 2.51 g aluminum nitrate in 20 ml deionized water. The washcoated CIH honeycomb had a pickup of 3.5–4 wt %. At a flow rate of 150 ml/min, the lead removal efficiency for the washcoated CIH honeycomb was 51% in the beginning and decreased to 36% after 80 liters of water passed through.

EXAMPLE 5

With the same sample preparation technique and lead removal testing procedure stated in Example 3, a commercial powdered amorphous titanium silicate (30.99 micrometers) was ground to a particle size of 50%=4.021 micrometers. About 5 g of the titanium silicate was mixed with 2.49 g aluminum nitrate in 20 ml deionized water.

The washcoated cordierite honeycomb had a pickup of about 3.5 wt %. At a flow rate of 150 ml/min, the lead removal efficiency for the washcoated CIH honeycomb was 78% in the beginning and decreased to 50% after 200 liters of water passed through.

EXAMPLE 6

A commercial powdered acidic γ-alumina (about 48.50 micrometers in particle size) with surface area of 265 m$^2$/g and pore volume of 0.72 ml/g was provided. With the same sample preparation technique and lead removal testing procedure described in Example 3, the γ-alumina was first ground to a particle size of 50%=3.221 micrometers. About 5 g of the γ-alumina was mixed with 5.00 g aluminum nitrate in 20 ml deionized water. The washcoated carbon impregnated cordierite honeycomb had a pickup of about 5.5 wt %. At a flow rate of 150 ml/min, the lead removal efficiency for the washcoated CIH honeycomb was 92% in the beginning and decreased to 76% after 60 liters of water passed through.

EXAMPLE 7a

A commercial powdered acidic γ-alumina (about 48.50 micrometers in particle size) with surface area of 265 m$^2$/g and pore volume of 0.72 ml/g was provided. With the same sample preparation technique and lead removal testing procedure described in Example 3, the γ-alumina was first ground to a particle size of 50%=3.221 micrometers. About 6.67 g of the γ-alumina was mixed with 3.33 g aluminum nitrate in 20 ml deionized water. The coated honeycomb was processed in the same manner as that described in Example 4 except that the honeycomb was continuously rotated for the first two hours of the drying step. The washcoated cordierite honeycomb had a pickup of about 9.9 wt. At a flow rate of 150 ml/min, the lead removal efficiency for the washcoated CIH honeycomb was 97% in the beginning and remained at 97% after 135 liters of water passed through.

EXAMPLE 7b

A commercial powdered titanium silicate (about 30.99 micrometers) was provided. With the same sample preparation technique and lead removal testing procedure described in Example 3, the titanium silicate was first ground to a particle size of 50%=4.021 micrometers. About 6.66 g of the titanium silicate was mixed with 3.33 g aluminum nitrate in 20 ml deionized water. The coated honeycomb was processed in the same manner as that described in Example 4 except that the honeycomb was continuously rotated for the first two hours of the drying step. The washcoated cordierite honeycomb had a pickup of about 4.5 wt. %. At a flow rate of 150 ml/min, the washcoated honeycomb had an efficiency of 89% over a range of 10–135 liters. The lead removal efficiency for the washcoated CIH honeycomb was 89% in the beginning and remained at the same efficiency after 135 liters of water passed through.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method of making a monolithic structure for purification of a liquid stream, the method comprising:
   a) providing an inorganic substrate having an inlet end and an outlet end and a multiplicity of cells extending from inlet to outlet end, the cells being separated from one another by porous walls, the cells being alternatively plugged at each end such that a liquid stream entering the device through the unplugged cells at the inlet end passes through porous walls, and thereafter passes out of the device through unplugged cells at the outlet end;
   b) applying a coating consisting essentially of an active material, a binder, and water, wherein said active material is an inorganic ion exchange material selected from the group consisting of zeolite, gamma alumina, and titanium silicate, wherein the average particle size of the inorganic ion exchange material after calcination is greater than the average cell wall pore size of the substrate;
   c) drying the resulting substrate with the active material at a temperature no greater than about 200° C.; and
   d) calcining the dried coated substrate at a temperature of no greater than about 650° C., to bond the active material to the substrate.

2. A method of claim 1 wherein the substrate is made of material selected from the group consisting of ceramics, glass, glass-ceramics, metal, molecular sieve, carbon, and combinations thereof.

3. A method of claim 1 wherein the substrate is provided as a honeycomb.

4. A method of claim 1 wherein the cell walls of the substrate having the active material have thicknesses and porosity suitable for filtration of parasites.

5. A method of claim 1 wherein active material is applied in the form of a slurry of suspended discrete particles that are contacted with the substrate at least one time to coat the substrate.

6. A method of claim 5 wherein the coating slurry further comprises binders.

7. A method of claim 6 wherein the binders are selected from the group consisting of colloidal alumina, aluminum nitrate, and combinations thereof.

8. A method of claim 5 wherein the viscosity of the coating slurry is about 10 to 10,000 cp.

9. A method of claim 8 wherein the viscosity of the coating slurry is about 20 to 200 cp.

10. A method of claim 5 wherein the particle size of the active powder in the coating slurry is about 1 to 100 micrometers.

11. A method of claim 10 wherein the particle size of the active powder in the coating slurry is about 2 to 10 micrometers.

12. A method of claim 5 wherein the drying is carried out under rotating conditions.

13. A method of claim 5 wherein the drying temperature is about 40° C. to 200° C.

14. A method of claim 13 wherein the drying temperature is about 80° C. to 150° C.

15. A method of claim 14 wherein the drying time is at least about 0.5 hour.

16. A method of claim 5 wherein the calcination temperature is about 250° C. to 650° C.

17. A method of claim 16 wherein the calcination temperature is about 300° C. to 500° C.

18. A method of claim 17 wherein the calcination time is at least about 0.5 hour.

19. A method of claim 17 wherein the calcination temperature is about 350 to 450° C.

20. A method of claim 19 wherein the calcination time is at least about 2 hour.

21. A method of claim 5 wherein the coating slurry is made up of active material, binder, and water in the weight ratio of about 1:1:2 to 1:20:20.

22. A method of claim 21 wherein said weight ratio is about 1:2:2 to 1:10:10.

23. A method of claim 5 wherein the coating is about 1 to 20% by weight based on the total weight of the structure.

24. A method of claim 23 wherein the coating is about 2 to 10% by weight based on the total weight of the structure.

25. A method of claim 5 wherein the coating slurry is contacted with the substrate one time.

26. A method of claim 1 wherein the active material coating is applied to the substrate by hydrothermal synthesis from active material precursors.

27. A method of claim 1 wherein the active material coating is applied to the substrate by contacting solutions of active material precursors with the substrate to grow a precipitate of the active material as a coating on the substrate.

* * * * *